(12) United States Patent
Lakshminarayan et al.

(10) Patent No.: US 10,063,845 B2
(45) Date of Patent: Aug. 28, 2018

(54) GUIDED 3D DISPLAY ADAPTATION

(71) Applicant: Dolby Laboratories Licensing Corporation, San Francisco, CA (US)

(72) Inventors: Gopi Lakshminarayan, Fremont, CA (US); Samir Hulyalkar, Los Gatos, CA (US); Tao Chen, Palo Alto, CA (US); Hariharan Ganapathy, Santa Clara, CA (US); Santosh Chilkunda, Santa Clara, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 297 days.

(21) Appl. No.: 14/781,560

(22) PCT Filed: Mar. 17, 2014

(86) PCT No.: PCT/US2014/030588
§ 371 (c)(1),
(2) Date: Sep. 30, 2015

(87) PCT Pub. No.: WO2014/165316
PCT Pub. Date: Oct. 9, 2014

(65) Prior Publication Data
US 2016/0065949 A1    Mar. 3, 2016

Related U.S. Application Data

(60) Provisional application No. 61/807,672, filed on Apr. 2, 2013.

(51) Int. Cl.
*H04N 13/00* (2018.01)
*H04N 13/04* (2006.01)
*H04N 13/02* (2006.01)

(52) U.S. Cl.
CPC ..... *H04N 13/0402* (2013.01); *H04N 13/0022* (2013.01); *H04N 13/0033* (2013.01); *H04N 13/0207* (2013.01); *H04N 13/0425* (2013.01)

(58) Field of Classification Search
CPC .......... H04N 13/0022; H04N 13/0033; H04N 13/0207; H04N 13/0425
See application file for complete search history.

(56) References Cited

U.S. PATENT DOCUMENTS 9,288,481 B2 * 3/2016 Wang ....................... G06F 3/013
9,407,904 B2 * 8/2016 Sandrew ............ H04N 13/0271
(Continued)

FOREIGN PATENT DOCUMENTS

CN         1577401         2/2005
CN       102474639         5/2012
(Continued)

OTHER PUBLICATIONS

Philips 3D Solutions: "3D Interface Specifications, white Paper", Feb. 15, 2008, pp. 1-29.

*Primary Examiner* — Helen Shibru

(57) ABSTRACT

A 3D display is characterized by a quality of viewing experience (QVE) mapping which represents a display-specific input-output relationship between input depth values and output QVE values. Examples of QVE mappings based on a metric of "viewing blur" are presented. Given reference depth data generated for a reference display and a representation of an artist's mapping function, which represents an input-output relationship between original input depth data and QVE data generated using a QVE mapping for a reference display, a decoder may reconstruct the reference depth data and apply an inverse QVE mapping for a target display to generate output depth data optimized for the target display.

10 Claims, 4 Drawing Sheets

(56) References Cited

U.S. PATENT DOCUMENTS

| | | | |
|---|---|---|---|
| 9,436,358 B2* | 9/2016 | Yang | G06F 3/0484 |
| 9,438,878 B2* | 9/2016 | Niebla, Jr. | H04N 13/0022 |
| 9,547,937 B2* | 1/2017 | Sandrew | G06T 19/00 |
| 9,560,334 B2* | 1/2017 | Ramachandra | H04N 13/0018 |
| 2011/0169818 A1 | 7/2011 | Pan | |
| 2011/0199465 A1 | 8/2011 | Barenbrug | |
| 2012/0127324 A1 | 5/2012 | Dickins | |
| 2012/0133645 A1 | 5/2012 | Jung | |
| 2012/0162379 A1* | 6/2012 | Dahi | H04N 5/23254 |
| | | | 348/47 |
| 2012/0249746 A1 | 10/2012 | Cornog | |
| 2012/0249750 A1 | 10/2012 | Izzat | |
| 2013/0033586 A1* | 2/2013 | Hulyalkar | H04N 13/0007 |
| | | | 348/51 |
| 2013/0051660 A1 | 2/2013 | Shibuhisa | |
| 2013/0170817 A1 | 7/2013 | Tagawa | |
| 2013/0258044 A1* | 10/2013 | Betts-Lacroix | H04N 13/0242 |
| | | | 348/36 |
| 2014/0098886 A1* | 4/2014 | Crenshaw | H04N 19/176 |
| | | | 375/240.16 |
| 2015/0227779 A1* | 8/2015 | Kawai | H04N 13/0018 |
| | | | 382/154 |

FOREIGN PATENT DOCUMENTS

| | | |
|---|---|---|
| CN | 103004214 | 3/2013 |
| JP | 2010-206774 | 9/2010 |
| JP | 2011-055022 | 3/2011 |
| TW | 201224516 | 6/2012 |
| WO | 2012/050089 | 4/2012 |
| WO | 2012/156518 | 11/2012 |
| WO | 2013/014836 | 1/2013 |
| WO | 2012/176431 | 2/2015 |

\* cited by examiner

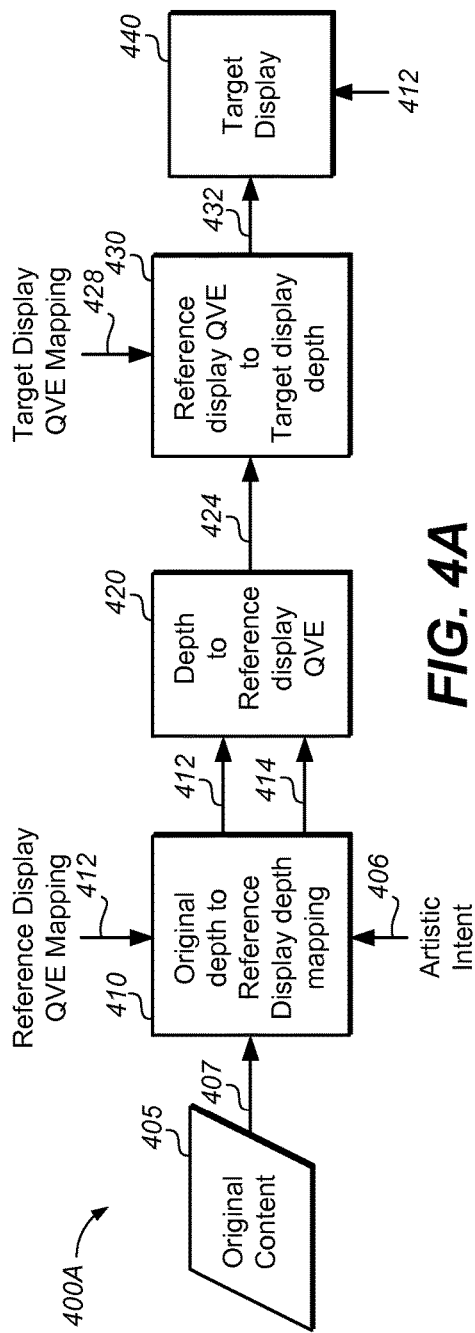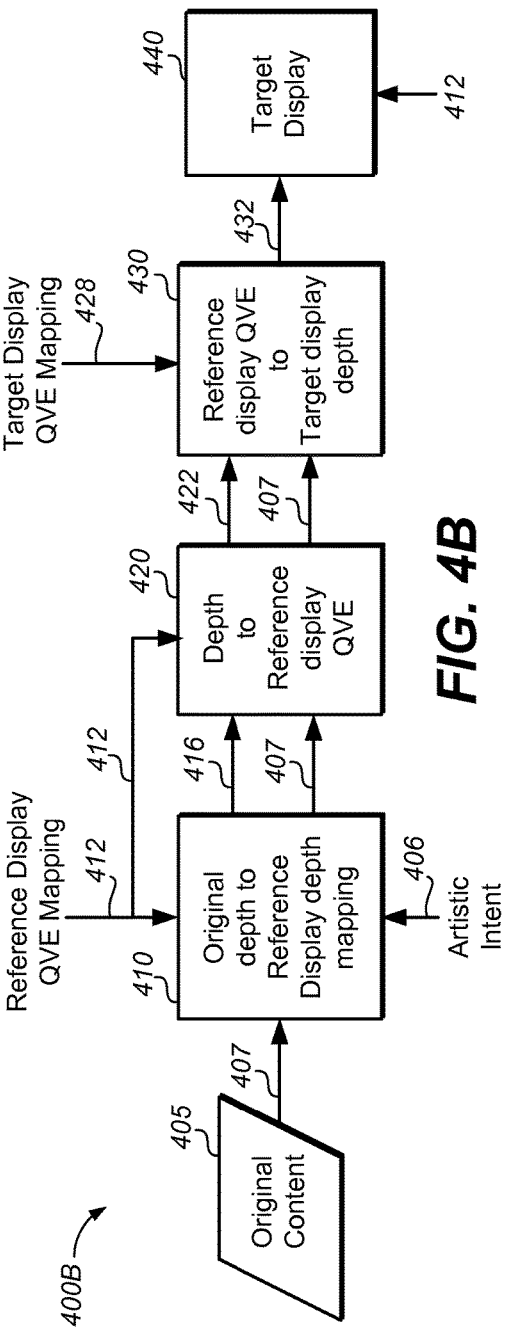

GUIDED 3D DISPLAY ADAPTATION

CROSS REFERENCE TO RELATED APPLICATIONS

This application claims priority to U.S. Provisional Application No. 61/807,672, filed on 2 Apr. 2013, incorporated herein by reference in its entirety.

TECHNOLOGY

The present invention relates generally to stereoscopic images and displays. More particularly, an embodiment of the present invention relates to the guided rendering of stereoscopic images onto stereoscopic or auto-stereoscopic displays.

BACKGROUND OF THE INVENTION 3D video systems garner great interest for enhancing a consumer's experience, whether at the cinema or in the home. These systems use stereoscopic or auto-stereoscopic methods of presentation, including:
(i) anaglyph—provides left/right eye separation by filtering the light through a two color filter, commonly red for one eye, and cyan for the other eye;
(ii) linear polarization—provides separation at the projector by filtering the left eye through a linear polarizer (commonly) oriented vertically, and filtering the right eye image through a linear polarizer oriented horizontally;
(iii) circular polarization—provides separation at the projector by filtering the left eye image through a (commonly) left handed circular polarizer, and filtering the right eye image through a right handed circular polarizer;
(iv) shutter glasses—provides separation by multiplexing the left and right images in time, and
(v) spectral separation—provides separation at the projector by filtering the left and right eye spectrally where the left and right eye each receives a complementary portion of the red, green, and blue spectrums.

Most of the 3D displays available in the market today are stereoscopic TVs, requiring the user to wear special 3D glasses in order to experience the 3D effect. Delivery of 3D content to these displays only requires carrying two separate views: a left view and a right view. Auto-stereoscopic (glasses-free) or multi-view displays are in the horizon. These displays provide some amount of motion parallax; the viewer can move his/her head around as if they are viewing objects from different angles as they move around.

Traditional stereoscopic displays provide a single 3D view; however, auto-stereoscopic displays are required to provide multiple views such as five views, nine views, 28 views, etc., based on the design of the display. When regular stereoscopic content is provided to auto-stereoscopic displays, the displays extract depth maps and create or render multiple views based on these depth maps. As used herein, the term "depth map" denotes an image or other bit-stream that contains information related to the distance of the surfaces of scene objects from a viewpoint. A depth map can be readily converted to a disparity map, and vice versa, and in the context of this document the terms depth map and disparity map are the same and inter-changeable.

3D content optimized for a certain target display (e.g., the screen of a movie theater) may appear differently on a stereoscopic or multi-view HDTV at home. The 3D viewing experience may also differ depending on the display's screen size, multi-view technology, and other parameters. As appreciated by the inventors here, it is desirable to develop improved techniques for rendering stereoscopic content on 3D displays, while preserving the original creator's (e.g., the director's) artistic intent.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not assume to have been recognized in any prior art on the basis of this section, unless otherwise indicated.

BRIEF DESCRIPTION OF THE DRAWINGS

An embodiment of the present invention is illustrated by way of example, and not in way by limitation, in the figures of the accompanying drawings and in which like reference numerals refer to similar elements and in which:

FIG. 4A and FIG. 4B depict example processes for guided 3D display adaptation according to embodiments.

DESCRIPTION OF EXAMPLE EMBODIMENTS

Figure 1A:
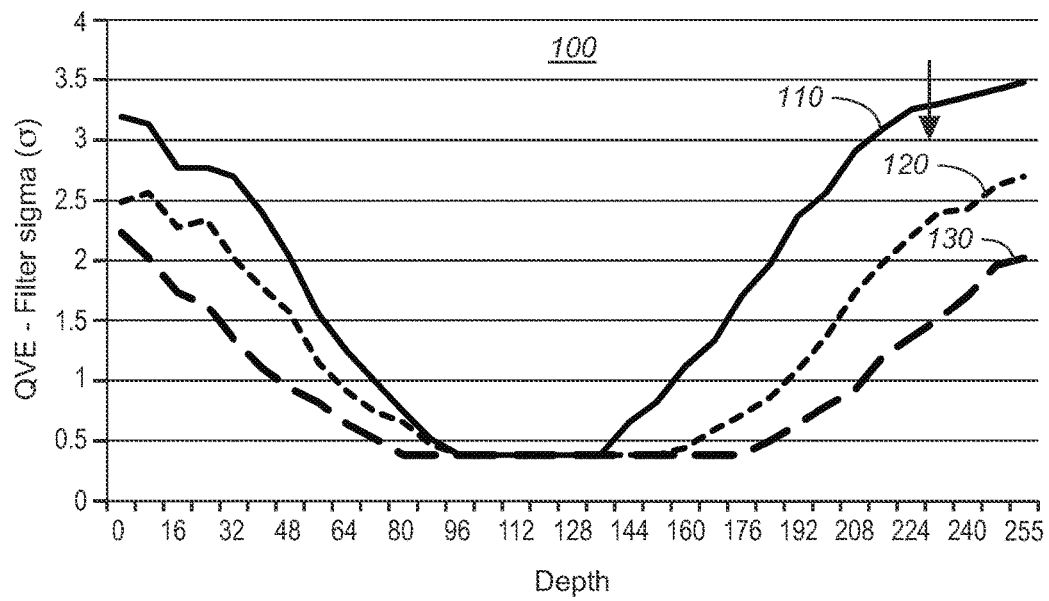
FIG. 1A and FIG. 1B depict examples of quality of viewing experience (QVE) mappings for three auto-stereoscopic displays according to an embodiment.

Guided 3D display adaption techniques for displaying stereoscopic images on stereoscopic and multi-view displays are described herein. A display is characterized using a quality of viewing experience (QVE) mapping (e.g., a mapping function or input-output curve) which represents a viewing experience metric on the particular 3D display as a function of input disparity or depth data. The mapping of depth data from a reference 3D display to any 3D display may be represented using a depth range conversion function and metadata created in response to the QVE mapping of the reference display and the director's original artistic intent. In the following description, for the purposes of explanation, numerous specific details are set forth in order to provide a thorough understanding of the present invention. It will be apparent, however, that the present invention may be practiced without these specific details. In other instances, well-known structures and devices are not described in exhaustive detail in order to avoid unnecessarily obscuring the present invention.

Overview

Example embodiments described herein relate to guided 3D display adaptation techniques for displaying stereoscopic images on stereoscopic and multi-view displays. 3D displays are characterized by a quality of viewing experience (QVE) mapping which represents a viewing experience metric on the particular 3D display as a function of input disparity or depth data. Examples of QVE mapping functions based on a metric of "viewing blur" are presented. Given reference depth data generated from input depth data for a reference display, and a representation of an artist's mapping function, which represents an input-output relationship between the input depth data and QVE data generated using a reference display QVE mapping, a decoder may reconstruct the reference depth data and apply an inverse QVE mapping for a target display to generate output depth data for the target display that also preserves the original artist's intent.

In another embodiment, a 3D display QVE mapping function is generated by displaying a stereo image at a known depth or disparity, capturing the displayed image with a 2D camera, and analyzing the captured 2D image to generate a corresponding QVE value. In an embodiment, the corresponding QVE value is a function of the standard deviation of a Gaussian blur filter, which given the test image as an input generates an output that is closest to the captured 2D image according to a given criterion.

In another embodiment, original input depth data for a stereoscopic image are received. In response to the original input depth data, using a reference display, reference depth map data are being generated. A depth range conversion function may represent the input-output relationship between the input depth data and the reference output depth data. In response to the reference depth map data and the reference display QVE mapping, quality of viewing experience (QVE) data are generated. An artist's mapping function, which represents an input-output relationship between the input depth data and the QVE data, is generated and is transmitted as metadata to a receiver together with either the reference depth map data or the original input depth data;

In another embodiment, a 3D display emulation system accesses original input depth data for a stereoscopic image. In response to the original input depth data, using a reference display, reference depth map data are being generated. In response to the reference depth map data and the reference display QVE mapping, quality of viewing experience (QVE) data are generated. A target display to be emulated is selected among different models of target displays and the QVE data are applied to an inverse QVE mapping for the emulated target display to generate target depth data for the emulated target display, wherein the inverse QVE mapping for the emulated target display represents an input-output relationship between input QVE values and output depth values as determined for the emulated target display.

Example Quality of Viewing Experience Mapping

In stereoscopic content production and display, the original release is typically optimized for a certain target display size and viewing distance and then it is delivered using a bitstream that includes image data and depth or disparity data. For example, live sports broadcast may be optimized for delivery to home 3D HDTVs, while theatrical releases may be optimized for 3D movie-theater projectors. As used herein, the term 'disparity' denotes the difference in distance between the location of an object in a left view and a right view of a stereoscopic image. In stereo video imaging, disparity typically represents the horizontal shift (e.g., to the left or to the right) of an image feature in one view (e.g., the left image) when viewed in the other view (e.g., the right image). For example, a point located in the horizontal positions $h_L$ in the left image and $h_R$ in the right image may be denoted as having a disparity of $h_L-h_R$ pixels.

Disparity data may also be represented as depth or "input Z" data, typically represented as grayscale data in the [0,255] range for 8-bit, although alternative representations are also possible. In an embodiment, given an input disparity D, and $d_{min}$ and $d_{max}$ disparity limit values as will be defined below, a disparity to depth transformation (Z) in the range [0,255] may be defined as:

$$Z = \text{round}\left((D - d_{min})\left(\frac{255}{d_{max} - d_{min}}\right)\right). \tag{1}$$

In equation (1), $d_{min}$ denotes the input disparity value in luminance pixels of the texture that corresponds to a decoded depth value Z=0. Negative values of $d_{min}$ relate to a virtual location in front of the screen plane. Similarly, $d_{max}$ defines the input disparity value in luminance pixels of the texture view that corresponds with a decoded depth value Z=255. The value of $d_{max}$ should be greater than $d_{min}$. Together $d_{min}$ and $d_{max}$ define the input disparity range to which the decoded depth values should be uniformly mapped. Given Z, $d_{min}$, and $d_{max}$ values, a reverse Z to D mapping may also be derived from equation (1) as $$D = \frac{Z(d_{max} - d_{min})}{255} + d_{min}. \tag{2}$$

Note that $d_{min}$ and $d_{max}$ values may vary on a per frame, per region of interest, per scene, or other suitable basis. For example, in a first scene the disparity range may be in the range [−10, 30] while in a second scene the disparity may be in the range [−50, 200]. These $d_{min}$ and $d_{max}$ values may be communicated to downstream processors or a target receiver (such as a set-top box) using metadata or ancillary bitstream data.

Delivering full resolution video and good quality depth/disparity map data is essential for both stereoscopic and auto-stereoscopic displays. Good quality disparity maps can be created during the 3D content creation process either manually or automatically. These disparity maps are typically created for a specific display type (e.g. a 3D cinema projector) and may not be suitable for other 3D displays (e.g., a portable gaming device or tablet with a 3D display or a home 3D HDTV) and hence need to be modified. For example, if a disparity map is created for a glasses-based cinema projector or glasses-based stereo TV, the disparity range can be more than what can be handled by a typical glasses-free auto stereoscopic (AS3D) display. For example, these disparity maps may not use the AS3D display's limited capabilities in an optimal fashion. Furthermore, AS3D displays are made by different manufacturers and have different characteristics from one another. Hence, given a reference stereoscopic image, there is a need to generate disparity maps which can be used universally across different types of 3D displays while also preserving the original director's intent.

According to an embodiment, a first step towards a solution to this problem is to define a mapping or function that uniquely characterizes the quality of viewing experience (QVE) on a particular display as a function of the disparity or depth of input data. In an embodiment, without loss of generality, the main parameter considered for representing the quality of viewing experience is "viewing blur"; however, it can be expanded to include other viewing factors, such as image ghosting or crosstalk, or image flipping (i.e., wiping effect) at the cone boundaries of a multi-view AS3D display.

In FIG. 1A, 100 depicts examples of QVE mappings (110, 120, 130) for three different auto-stereoscopic displays according to an example embodiment. Measured diagonally, 100 depicts QVE mappings for an 11 inches display (110), a 23 inches display (120), and a 56 inches display (130). As will explained in more detail later, in this embodiment, the y-axis of 100 provides a measure of output blur as computed for input images with depth values ranging between 0 and 255.

Figure 2:
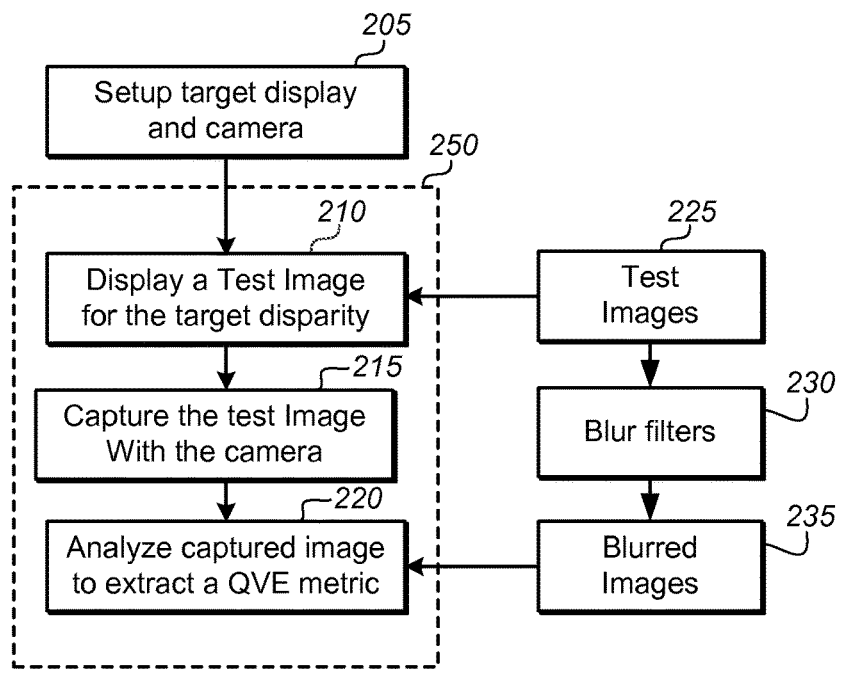
FIG. 2 depicts an example process to determine the QVE mapping of a target display according to an embodiment.
Figure 3:
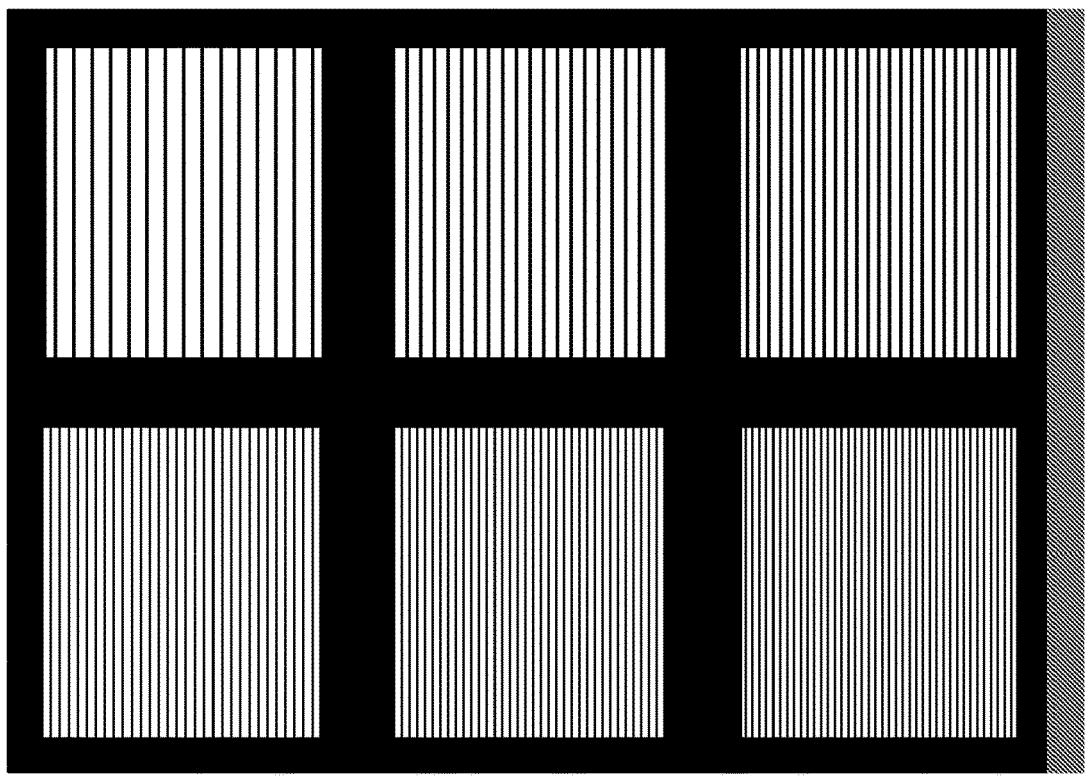
FIG. 3 depicts example target test images to determine the QVE mapping of a target display according to an embodiment.

FIG. 2 depicts an example process to derive the QVE mapping (e.g., 110, 120, or 130) for a specific display according to an embodiment. As depicted in FIG. 2, in step 205, the process starts by setting up the display under consideration and a camera to capture test images projected onto the display. Set-up comprises calibrating the display and placing the camera at a typical viewing distance for the target display (e.g., 1.5 feet for an 11 inch display). For auto-stereoscopic displays, the camera is also placed at the center of the display's viewing cone. Given a target depth range (e.g., 0 to 255) a set of test images (225) is prepared for each depth value under testing. Note that disparity-related parameters (e.g., $d_{min}$ and $d_{max}$) may vary for each display. In an embodiment, each of the test images 225 may comprise a series of vertical lines of variable width. For example, the vertical lines may represent a spatial 2-D sinusoid wave plotted at various frequencies. Examples of such test patterns are depicted in FIG. 3.

Processing loop 250 is repeated for each depth value under consideration and includes the following steps: (a) In step 210, a target test image is displayed. (b) In step 215, the displayed image is captured by the camera as a 2D image. Because of the embedded disparity in the test image, it is expected that the captured image by the camera will be of worse visual quality (e.g., more blurry) than the original test image. Finally, (c) in step 220, the captured image is analyzed and is assigned a QVE metric. The QVE metric could be either subjective or objective, and is assigned a numerical value according to some pre-determined criterion. In one embodiment (100), an objective QVE metric between 0 and 4 represents the standard deviation σ of a Gaussian blur filter that yields an output of equivalent blur as the input disparity. An example of computing such a metric is discussed next.

Given that "visual blur" is considered the main parameter of the visual experience factor, each test image (225) may be blurred using a variety of blur filters (230), such as a set of Gaussian blur filters or any other type of low-pass or blur filters. In an embodiment, each of these Gaussian blur filters may have the same size kernel but a different standard deviation σ parameter (e.g., 5 between 0.3 and 4). Then, in step 220, each captured image (215) is compared against the set of all blurred images (230) according to an error criterion, such as the commonly used SNR (signal-to-noise ratio) and Peak-SNR criteria. Then, for a given depth, the output QVE metric (e.g., QVE=3.0) may be defined as the standard deviation of the blur filter for which its output best matches the captured test image according to the given criterion.

Figure 1B:
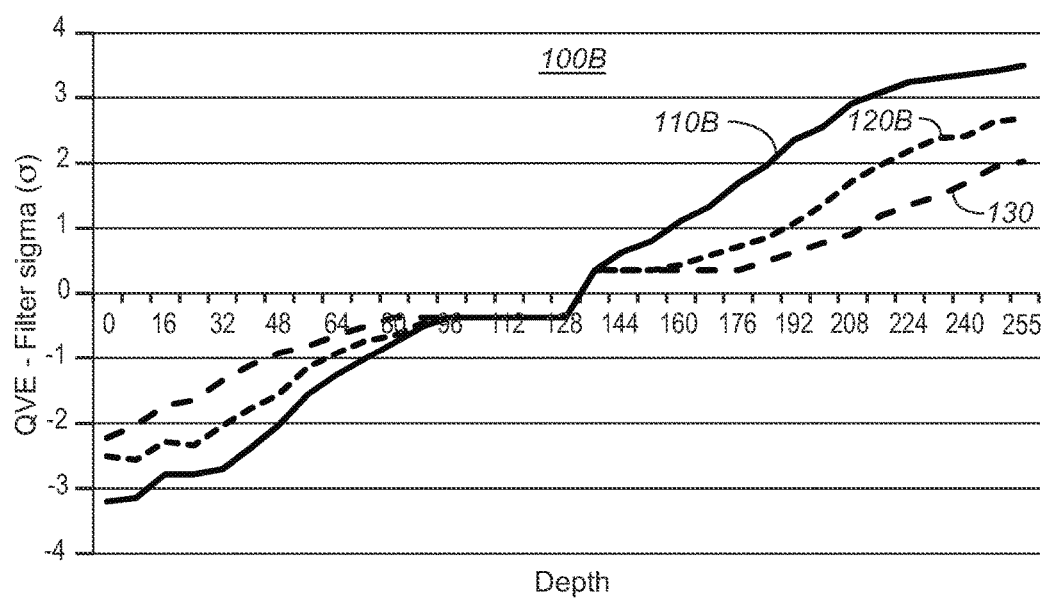

As it will be further discussed later, given a QVE mapping (e.g. $f_{TQ}(Z)$ 110), in some embodiments it may be desirable to apply its inverse $f_Z(Q)=f_{TQ}^{-1}(Z)$, so that for a given QVE value (e.g., Q) one can determine the corresponding depth $Z=f_Z(Q)$. However, the representation of QVE mappings as depicted in FIG. 1A is not suitable for defining an inverse since a single QVE value may be mapped into two different depth values. Given a QVE mapping $f_{TQ}(Z)$ as depicted in FIG. 1A, in some embodiments, an invertible $f_Q(Z)$ mapping function may be derived as follows:

$$f_Q(Z) = \begin{cases} f_{TQ}(Z), & \text{if } D \geq 0 \\ -f_{TQ}(Z), & \text{if } D < 0 \end{cases} \quad (3)$$

where for a given depth Z, $d_{min}$ and $d_{max}$, disparity D may be computed using equation (2). For the family of $f_{TQ}(Z)$ mappings depicted in FIG. 1A, FIG. 1B depicts example corresponding $f_Q(Z)$ mappings.

Applications to Guided Display Adaptation

FIG. 4A depicts an example guided display adaptation process for 3D displays according to an embodiment. Original content 405 comprises image and depth or disparity data created for an original release targeting an original target display (e.g., a cinema projector). In many cases of interest, this content needs to be reprocessed to generate another release targeting different types of displays.

Step 410 denotes a typical post-production stage where input depth data 407 (e.g., denoted by $Z_I(n)$) are translated to reference depth data 414 (e.g., denoted by $Z_R(n)$) for a reference display used during the post-production process. This process is typically semi-automated with some input 406 from the original artists (director, cinematographer, etc.) to preserve the director's intent. This process may also include additional processing steps (not shown), such as color grading, or color mapping from an enhanced or high dynamic range to a lower dynamic range. In one embodiment of 3D content post-production and distribution (400A), output of step 410 may comprise output reference depth data 414 (e.g., $Z_R(n)$) generated using a depth-range conversion function (e.g., denoted by $f_{CR}(Z)$, such that output 414 $Z_R(n)=f_{CR}(Z_I(n))$. In an embodiment, an output of process 410 may also include a representation of the display QVE mapping 412 (e.g., denoted as $f_{QR}(Z)$) for the reference display used to generate reference depth map data 414. Reference display QVE mapping 412 may be transmitted along with depth data 414 as metadata along with other metadata. Reference display QVE mapping 412 may be transmitted in a variety of ways known in the art, such as a look-up table, as parameters of a parametric linear, piece-wise linear, or non-linear function, and the like, so that it may be reconstructed by a downstream processing step, such as depth converter 420.

Given the reference display QVE mapping 412 (e.g., $f_{QR}(Z)$) and reference depth data 414 (e.g., $Z_R(n)$), depth converter 420 can translate the depth data 414 to QVE values 424 (e.g., denoted by $Q_R(n)$) according to the QVE mapping 412 (e.g., $Q_R(n)=f_{QR}(Z_R(n))$). In some embodiments, step 420 may be part of the encoder or transmitter that broadcasts QVE values 424 to a suitable receiver, such as a set-top box receiver or a 3D TV. In such a scenario, bitstream 424 already incorporates information related to the reference display QVE mapping and no other information needs to be transmitted. In some other embodiments, step 420 may be part of a decoder, such as a set-top box receiver or a 3D TV. In such a scenario, the encoder needs to transmit both reference depth data 414 and the reference display QVE mapping 412. Legacy receivers may ignore the reference display mapping 412 and simply process the depth data to the best of their ability; however, as will be described next, newer decoders that are enabled to interpret correctly the guiding QVE mapping metadata, may use them to further improve the display of image data 412 onto the target display (440).

Let $f_{QT}(Z)$ denote the QVE mapping function 428 for a target display 440. As noted earlier, given $f_{QT}(Z)$ (e.g., 110B) a display processor can easily construct its inverse $f_{QT}^{-1}(Q)$ which for an input VQE value outputs a corresponding Z value. In step 430, in a receiver, given the set of input QVE values 424 (e.g., $Q_R(n)$), the final target display depth data 432 (e.g., denoted by $Z_T(n)$) may be generated as $$Z_T(n) = f_{QT}^{-1}(Q_R(n)). \quad (4)$$

FIG. 4B depicts an alternative embodiment for guided display adaptation.

Similarly to process 400A, step 410 in 400B generates depth data targeting a class of displays; however, instead of outputting the output depth data itself (e.g., $Z_R(n)$ 414) and the reference display QVE mapping 412, step 410 outputs the original depth data 407 (e.g., $Z_I(n)$) and a representation of the depth-range conversion function ($f_{CR}(Z)$), such that $Z_R(n) = f_{CR}(Z_I(n))$.

Given $Z_I(n)$ 407, $f_{CR}(Z)$, and the reference display QVE mapping 412 ($f_{QR}(Z)$), step 420 may generate a mapping function 422 $f_{QR\_A}(Z)$ representing the artist's intent so that $Q_R(n)$ 424 may be expressed as $Q_R(n) = f_{QR\_A}(Z_I(n))$. In an embodiment, a representation of mapping function 422 $f_{QR\_A}(Z)$ may be signaled from a transmitter or encoder to a downstream decoder using metadata along with depth data 407. Mapping function 422 may be transmitted in a variety of ways known in the art, such as a look-up table, as parameters of a parametric linear, piece-wise linear, or non-linear function, and the like, so that it may be reconstructed by a downstream processing step, such as QVE data to depth converter 430.

Given $Z_I(n)$ 407, $f_{QR\_A}(Z)$ 422, and target display QVE mapping 428 ($f_{QT}(Z)$), as explained earlier, process 430 may generate the final $Z_T(n)$ depth data 432 as follows:

$$Q_R(n) = f_{QR\_A}(Z_I(n)),$$

$$Z_T(n) = f_{QT}^{-1}(Q_R(n))$$

In some embodiments, the depth data conversion function 416 ($f_{CR}(Z)$) generated in step 410 may also be transmitted to a receiver in addition to the $f_{QR\_A}(Z)$ function 422. This will allow legacy decoders with no concept of QVE mapping to be able to reconstruct $Z_T(n)$ as $Z_T(n) = f_{CR}(Z_I(n))$.

In some embodiments, to preserve bandwidth and minimize the transmitted data rate, a transmitter may transmit only a partial representation of the artist's mapping function $f_{QR\_A}(Z)$ function. Then a decoder may reconstruct a close approximation of $f_{QR\_A}(Z)$. In the context of this document, the use of an exact or approximate version of $f_{QR\_A}(Z)$ is the same and inter-changeable.

Display Emulation

Figure 5:
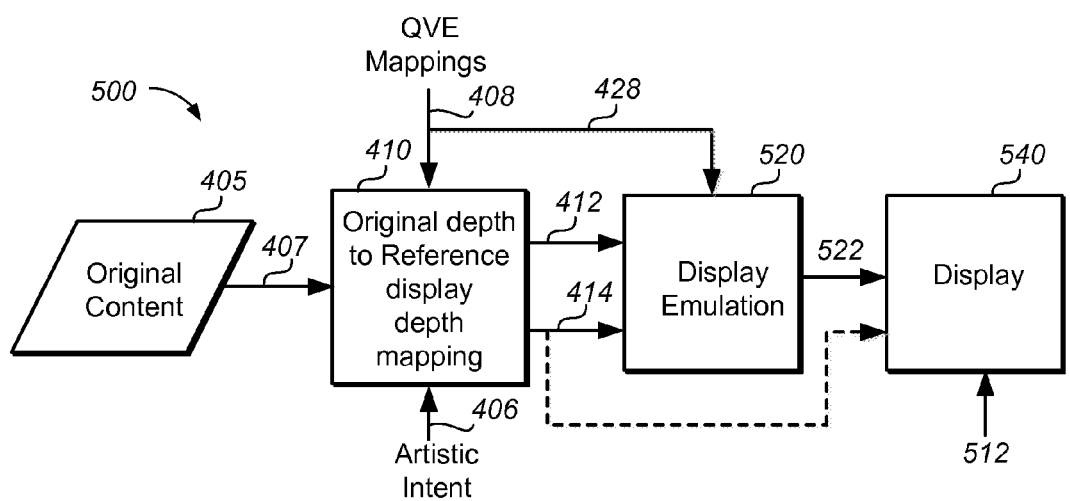
FIG. 5 depicts an example process for 3D display emulation according to an embodiment.

In some embodiments, during the content creation stage 410, a family of QVE mapping functions 408 may be used to emulate viewing conditions on different target displays using a single reference display 540. In an embodiment, FIG. 5 depicts an example process for 3D display emulation. Process 500 is similar to process 400A, except that processing steps 420 and 430 may now be integrated into the single step of display emulation 520.

During post-production 500, the artist 406 may use display 540 as a reference display to generate reference depth data 414. During this processing stage, the display emulation process 520 may be bypassed and display 540 may display the color graded image content 512 based directly on reference depth data 414. In case the artist wants to emulate how the output 414 will be viewed in another display (with either a known or future QVE mapping function of a futuristic display), then display 540 may be fed depth data as generated by display emulation 520, which simply combines steps 420 and 430 described earlier as part of process 400A. Under the display emulation mode, QVE mapping function 428 represents the QVE mapping for the target emulated display.

Table 1 summarizes key symbols and nomenclature used herein.

TABLE 1

Key Symbols and Nomenclature

| Symbol | Definition | Comments |
|---|---|---|
| $Z_I(n)$ | Original input depth map | All Z depth values may also be expressed in terms of disparity D values within a $[d_{min}, d_{max}]$ range and vice versa. |
| $Z_R(n)$ | Reference depth map | $Z_R(n) = f_{CR}(Z_I(n))$; generated with artist's input |
| $f_{CR}(Z)$ | Depth-map conversion function | $Z_R(n) = f_{CR}(Z_I(n))$ |
| $f_{QR}(Z)$ | Reference display QVE mapping function | Maps Z values to display-specific QVE values |
| $f_{QT}(Z)$ | Target display QVE mapping function | |
| $Q_R(n)$ | QVE reference data | $Q_R(n) = f_{QR}(Z_R(n))$ |
| $f_{QR\_A}(Z)$ | Artist's QVE conversion function | $Q_R(n) = f_{QR\_A}(Z_I(n))$ |
| $f_{QT}^{-1}(Q)$ | Target display inverse QVE mapping function | Maps QVE values to display-specific Z values |
| $Z_T(n)$ | Target display depth map | $Z_T(n) = f_{QT}^{-1}(Q_R(n))$ |

Example Computer System Implementation

Embodiments of the present invention may be implemented with a computer system, systems configured in electronic circuitry and components, an integrated circuit (IC) device such as a microcontroller, a field programmable gate array (FPGA), or another configurable or programmable logic device (PLD), a discrete time or digital signal processor (DSP), an application specific IC (ASIC), and/or apparatus that includes one or more of such systems, devices or components. The computer and/or IC may perform, control or execute instructions relating to guided 3D display adaptation, such as those described herein. The computer and/or IC may compute any of a variety of parameters or values that relate to guided 3D display adaptation as described herein. The guided 3D display adaptation embodiments may be implemented in hardware, software, firmware and various combinations thereof.

Certain implementations of the invention comprise computer processors which execute software instructions which cause the processors to perform a method of the invention. For example, one or more processors in a display, an encoder, a set top box, a transcoder or the like may implement methods for guided 3D display adaptation as described above by executing software instructions in a program memory accessible to the processors. The invention may also be provided in the form of a program product. The program product may comprise any medium which carries a set of computer-readable signals comprising instructions which, when executed by a data processor, cause the data processor to execute a method of the invention. Program products according to the invention may be in any of a wide variety of forms. The program product may comprise, for example, physical media such as magnetic data storage media including floppy diskettes, hard disk drives, optical data storage media including CD ROMs, DVDs, electronic data storage media including ROMs, flash RAM, or the like. The computer-readable signals on the program product may optionally be compressed or encrypted.

Where a component (e.g. a software module, processor, assembly, device, circuit, etc.) is referred to above, unless otherwise indicated, reference to that component (including a reference to a "means") should be interpreted as including as equivalents of that component any component which performs the function of the described component (e.g., that is functionally equivalent), including components which are not structurally equivalent to the disclosed structure which performs the function in the illustrated example embodiments of the invention.

EQUIVALENTS, EXTENSIONS, ALTERNATIVES AND MISCELLANEOUS

Example embodiments that relate to guided 3D display adaptation are thus described. In the foregoing specification, embodiments of the present invention have been described with reference to numerous specific details that may vary from implementation to implementation. Thus, the sole and exclusive indicator of what is the invention, and is intended by the applicants to be the invention, is the set as recited in Claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method for guided 3D display adaptation, the method comprising:
   receiving original input depth data for a stereoscopic image;
   generating reference depth map data, the reference depth map data being generated in response to the original input depth data and a depth range conversion function; and
   generating quality of viewing experience (QVE) data in response to the reference depth map data and a reference display QVE mapping, wherein the reference display QVE mapping represents an input-output relationship between input depth or disparity values and output QVE values as determined for the reference display;
   wherein generating the QVE display value comprises:
      generating a set of blurred images with a blur filter in response to a view of the test stereo image, wherein each blurred image in the set of blurred images is generated using a different blur parameter;
      comparing a captured image to one or more of the blurred images in the set of blurred images to determine one or more difference metrics according to an image comparison criterion; and
      generating the output QVE value in response to the one or more determined difference metrics.

2. The method of claim 1, further comprising:
   generating an artist's mapping function, the artist's mapping function representing an input-output relationship between the original input depth data and the QVE data; and
      transmitting to a receiver the artist's mapping function and the original input depth data.

3. The method of claim 1, further comprising transmitting to a receiver the QVE data.

4. The method of claim 1, further comprising transmitting to a receiver the reference depth data and a representation of the reference display QVE mapping.

5. The method of claim 1, further comprising transmitting to a receiver the original input depth data, a representation of the reference display QVE mapping, and a representation of the depth range conversion function.

6. A method for guided 3D display adaptation in a decoder, the method comprising:
   receiving at the decoder QVE data generated by an encoder according to claim 3; and
   applying to the QVE data an inverse QVE mapping for a target display to generate target depth data for the target display, wherein the inverse QVE mapping for the target display represents an input-output relationship between input QVE values and output depth values as determined for the target display.

7. A non-transitory computer-readable storage medium having stored thereon computer-executable instructions for executing a method with one or more processors in accordance with claim 1.

8. The method of claim 1, further comprising:
   displaying on the 3D display a test stereo image with the input depth or disparity; and
   capturing the displayed image with a camera to generate the captured image, wherein the captured image is a 2D captured image.

9. A method for 3D display emulation, the method comprising:
   receiving original input depth data for a stereoscopic image;
   generating reference depth map data, the reference depth map data being generated in response to the original input depth data and a depth range conversion function;
   generating quality of viewing experience (QVE) data in response to the reference depth map data and a reference display QVE mapping, wherein the reference display QVE mapping represents an input-output relationship between input depth or disparity data and output QVE values as determined for the reference display;
   selecting to emulate a target display; and
   applying to the QVE data an inverse QVE mapping for the emulated target display to generate target depth data for the emulated target display, wherein the inverse QVE mapping for the emulated target display represents an input-output relationship between input QVE values and output depth values as determined for the emulated target display;
   wherein generating the QVE display value comprises:
      generating a set of blurred images with a blur filter in response to a view of the test stereo image, wherein each blurred image in the set of blurred images is generated using a different blur parameter;
      comparing a captured image to one or more of the blurred images in the set of blurred images to determine one or more difference metrics according to an image comparison criterion; and
      generating the output QVE value in response to the one or more determined difference metrics.

10. The method of claim 9, further comprising:
   displaying on the 3D display a test stereo image with the input depth or disparity; and
   capturing the displayed image with a camera to generate the captured image, wherein the captured image is a 2D captured image.

* * * * *